(12) United States Patent
Mazanek et al.

(10) Patent No.: US 9,539,978 B2
(45) Date of Patent: Jan. 10, 2017

(54) CURTAIN AIRBAG FOR A VEHICLE

(71) Applicant: AUTOLIV DEVELOPMENT AB, Vårgårda (SE)

(72) Inventors: Jan Mazanek, Billdal (SE); Dion Kruse, Alingsås (SE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 66 days.

(21) Appl. No.: 14/361,086

(22) PCT Filed: Nov. 21, 2012

(86) PCT No.: PCT/SE2012/051282
§ 371 (c)(1),
(2) Date: May 28, 2014

(87) PCT Pub. No.: WO2013/081530
PCT Pub. Date: Jun. 6, 2013

(65) Prior Publication Data
US 2015/0115581 A1     Apr. 30, 2015

(30) Foreign Application Priority Data
Nov. 30, 2011  (DE) .................. 10 2011 087 449

(51) Int. Cl.
*B60R 21/2334*   (2011.01)
*B60R 21/213*    (2011.01)
(Continued)

(52) U.S. Cl.
CPC ......... *B60R 21/2334* (2013.01); *B60R 21/213* (2013.01); *B60R 21/232* (2013.01);
(Continued)

(58) Field of Classification Search
CPC ................. B60R 21/2334; B60R 21/23138; B60R 21/213; B60R 21/2338; B60R 21/232; B60R 2021/23386
See application file for complete search history.

(56) References Cited

U.S. PATENT DOCUMENTS 5,222,761 A   6/1993   Kaji et al.
5,251,931 A   10/1993  Semchena et al.
(Continued)

FOREIGN PATENT DOCUMENTS

DE           10038088 A1      2/2002
DE    10 2006 049 431 A1      4/2008
(Continued)

OTHER PUBLICATIONS

International Search Report and Written Opinion of the ISA for PCT/SE2012/051282, ISA/SE, mailed Mar. 1, 2013.

*Primary Examiner* — Paul N Dickson
*Assistant Examiner* — Joselynn Y Sliteris
(74) *Attorney, Agent, or Firm* — Stephen T. Olson; Harness, Dickey & Pierce, P.L.C.

(57) ABSTRACT

A curtain airbag for a vehicle includes a main chamber shaped in such a way that, in the position being mounted on the vehicle, in the inflated state the main chamber covers an inner side structure of the vehicle. The curtain airbag further includes an additional chamber which, in the mounting position, is located on the in driving direction of the vehicle front portion of the main chamber, and deploys in the direction of the interior of the vehicle when the curtain airbag is inflated. An extended section connects the additional chamber and the main chamber at a rim section at the same side and limits movement of the additional chamber during the inflation process.

12 Claims, 9 Drawing Sheets

(51) Int. Cl.
*B60R 21/231* (2011.01)
*B60R 21/232* (2011.01)
*B60R 21/2338* (2011.01)

(52) U.S. Cl.
CPC .... *B60R 21/2338* (2013.01); *B60R 21/23138* (2013.01); *B60R 2021/23386* (2013.01)

(56) References Cited

U.S. PATENT DOCUMENTS

| | | | |
|---|---|---|---|
| 6,206,411 B1 | 3/2001 | Sunabashiri | |
| 6,695,342 B2 | 2/2004 | Tanase et al. | |
| 6,971,665 B2 * | 12/2005 | Tanaka | B60R 21/232 280/729 |
| 7,025,376 B2 * | 4/2006 | Dominissini | B60R 21/233 280/729 |
| 7,216,891 B2 | 5/2007 | Biglino | |
| 7,523,958 B2 | 4/2009 | Jang et al. | |
| 7,549,672 B2 * | 6/2009 | Sato | B60R 21/207 280/729 |
| 7,571,927 B2 | 8/2009 | Purvis et al. | |
| 7,597,350 B2 | 10/2009 | Lim | |
| 7,614,655 B2 | 11/2009 | Hasebe | |
| 7,695,000 B2 | 4/2010 | Jang et al. | |
| 7,699,339 B2 | 4/2010 | Jang et al. | |
| 7,735,855 B2 | 6/2010 | Jang et al. | |
| 7,762,579 B2 | 7/2010 | Garner | |
| 7,784,823 B2 | 8/2010 | Heigl et al. | |
| 7,828,322 B2 * | 11/2010 | Breuninger | B60R 21/231 280/730.2 |
| 7,891,704 B2 | 2/2011 | Taguchi et al. | |
| 7,938,438 B2 | 5/2011 | Denys et al. | |
| 7,954,846 B2 | 6/2011 | Iwayama et al. | |
| 7,976,055 B2 | 7/2011 | Son | |
| 8,894,094 B2 * | 11/2014 | Wang | B60R 21/232 280/730.2 |
| 8,998,250 B2 * | 4/2015 | Kruse | B60R 21/232 280/729 |
| 9,156,427 B2 * | 10/2015 | Wang | B60R 21/232 |
| 2005/0057023 A1 | 3/2005 | Burton et al. | |
| 2005/0073135 A1 | 4/2005 | Choi | |
| 2005/0184494 A1 * | 8/2005 | Sakata | B60R 21/207 280/730.2 |
| 2006/0119083 A1 * | 6/2006 | Peng | B60R 21/207 280/730.2 |
| 2006/0157958 A1 | 7/2006 | Heudorfer et al. | |
| 2007/0040368 A1 | 2/2007 | Manley | |
| 2008/0106082 A1 | 5/2008 | Choi | |
| 2009/0001692 A1 | 1/2009 | Denys et al. | |
| 2009/0091105 A1 | 4/2009 | Okimoto et al. | |
| 2010/0264631 A1 | 10/2010 | Tomitaka et al. | |
| 2011/0057422 A1 | 3/2011 | Cheal et al. | |
| 2011/0074141 A1 | 3/2011 | Wipasuramonton et al. | |
| 2011/0316260 A1 | 12/2011 | Jaconelli et al. | |
| 2012/0038135 A1 | 2/2012 | Oomori et al. | |
| 2013/0270805 A1 | 10/2013 | Kruse et al. | |
| 2016/0200281 A1 * | 7/2016 | Takeshita | B60R 21/23138 280/730.2 |
| 2016/0229370 A1 * | 8/2016 | Hampson | B60R 21/232 |

FOREIGN PATENT DOCUMENTS

| | | | |
|---|---|---|---|
| DE | 102006051552 A1 | 5/2008 | |
| DE | 102006051553 A1 | 5/2008 | |
| DE | 102007007781 A1 | 8/2008 | |
| DE | 102008015228 A1 | 10/2008 | |
| DE | 102007028803 A1 | 12/2008 | |
| DE | 102009022044 A1 | 12/2009 | |
| DE | 102008031880 A1 | 1/2010 | |
| EP | 1110825 A1 | 6/2001 | |
| EP | 1264742 A2 | 12/2002 | |
| EP | 1502824 A1 | 2/2005 | |
| EP | 1798117 A1 | 6/2007 | |
| EP | 1837252 A1 | 9/2007 | |
| EP | 1992526 A2 | 11/2008 | |
| EP | 2008879 | 12/2008 | |
| GB | 2309440 A | 7/1997 | |
| GB | 2357999 A | 7/2001 | |
| JP | 2004-009790 A | 1/2004 | |
| JP | 2004-262399 A | 9/2004 | |
| JP | 2008-006895 A | 1/2008 | |
| JP | 2008-120146 A | 5/2008 | |
| JP | 2008-201172 A | 9/2008 | |
| JP | 2010-143233 A | 7/2010 | |
| KR | 10-0831504 B1 | 5/2008 | |
| KR | 2009-0066396 A | 6/2009 | |
| KR | 10-0999680 B1 | 12/2010 | |
| WO | WO 2005118350 | * 12/2005 | B60R 21/232 |
| WO | WO-2007/018650 A2 | 2/2007 | |
| WO | WO-2007065650 A2 | 6/2007 | |
| WO | WO-2010066371 A1 | 6/2010 | |
| WO | WO-2010076881 A1 | 7/2010 | |
| WO | WO-2010099871 A1 | 9/2010 | |
| WO | WO-2010136129 A1 | 12/2010 | |
| WO | WO-2011/037198 A1 | 3/2011 | |
| WO | WO-2012008900 A1 | 1/2012 | |
| WO | WO-2012053956 A1 | 4/2012 | |
| WO | WO-2012060574 A2 | 5/2012 | |
| WO | WO-2012/091656 A1 | 7/2012 | |
| WO | WO-2013133548 A1 | 9/2013 | |
| WO | WO-2013137565 A1 | 9/2013 | |
| WO | WO-2014121920 A1 | 8/2014 | |

* cited by examiner

CURTAIN AIRBAG FOR A VEHICLE

CROSS-REFERENCE TO RELATED APPLICATIONS

This application is a 371 U.S. National Stage of International Application No. PCT/SE2012/051282, filed Nov. 21, 2012, which claims priority to German Patent Application No. DE 102011087449.6, filed Nov. 30, 2011. The disclosures of the above applications are incorporated herein by reference.

BACKGROUND

The invention relates to a curtain airbag for a vehicle.

DISCUSSION

The curtain airbag is located in the vehicle at the upper edge of the inner side structure of the vehicle and, in the event of an accident, is inflated in such a way that in the inflated state it covers the inner side structure of the vehicle and thereby prevents the occupant from directly hitting the same and sustaining severe injuries or being thrown out of an open window.

For the protection of the occupant, an airbag, which is designed as most often a round bag and in the inflated state covers the steering wheel, is further provided in the steering wheel of the vehicle as well. As the steering wheel naturally is arranged to perform a rotational movement, with a steering wheel hub not being fixed the airbag as well performs this rotational movement, so that the airbag itself needs to be designed to be symmetric and in particular to be round, in order that it can fulfill its protective function independent of the position of the steering wheel.

Thus, in the event of an accident, during the occurring forward movement the occupant generally is protected by the side curtain airbag and the airbag in the steering wheel.

In tests it has turned out that in the event of a frontal impact with a small overlap only, for example of 10-25% of the front end of the vehicle, or a corner or angled impact, the A-pillar already at low impelling forces is dislocated very far into the passenger compartment. Furthermore, the dashboard of the vehicle is dislocated from its side edge obliquely to the center and the lower part of the A-pillar is intruding into the compartment of the vehicle, so that an enlarged gap between the side edge of the dashboard and the inner side structure of the vehicle is generated. Owing to the impact direction the occupant further is accelerated directly in the direction of the gap existent between the curtain airbag and the airbag of the steering wheel, so that owing to the nonexistent connection of the airbags the occupant may hit the A-pillar moving in or from above may hit the side door frame through the airbags, or the occupant slides of the frontal airbag into the gap.

For the above-mentioned reasons, an enhanced risk of injury for the occupant even results from accidents with low impelling forces and a small lateral overlap.

SUMMARY

It is the object of the invention to provide a curtain airbag, with which the risk of injury for the occupant which is enhanced due to the above-mentioned reasons can be reduced.

For the solution of the object it is proposed that the curtain airbag comprises an additional chamber which, in the mounting position, is located on the in driving direction of the vehicle front portion of the main chamber, and deploys in the direction of the interior of the vehicle when the curtain airbag is inflated, wherein a extended section is provided which connects the additional chamber and the main chamber at a rim section at the same side and which limits the movement of the additional chamber during the inflation process. Thus, the advantage of the curtain airbag improved according to the invention is that the curtain airbag is inflated together with the additional chamber to form a curved structure, in which the occupant is caught during the forward displacement, so that he cannot pass through the gap between the curtain airbag and the airbag in the steering wheel. The additional chamber deploying into the interior of the vehicle owing to its direction of deployment covers the A-pillar and the front section of the upper door frame, so that the surface of the interior of the vehicle as a whole is covered by the curved curtain airbag even in an area, the occupant would be very likely to hit during the obliquely directed forward displacement, whereby the risk of severe injuries in the event of accidents with a small overlap can be reduced significantly. The term "deploys in the direction of the interior of the vehicle" means, that the additional chamber is extending from the plane inner side structure of the vehicle into the interior of the compartment, which results finally to an L-shaped design of the curtain airbag. The extended section is dimensioned and arranged in a position at the rim of the additional chamber in that way that the additional chamber moves automatically towards the interior of the vehicle. An important feature of the design is that the extended section connects the additional chamber and the main chamber at the same side, so either at the upper or at the lower rim of the additional and the main chamber, so that the extended section does not cross the main chamber and the additional chamber. Furthermore a very effective shape of the main chamber and the additional chamber for the restraint function can be provided when the additional chamber and the opposing section of the main chamber are forming a shape like a catching baseball glove without crossing tethers, in which the occupant may dive. The advantage is that the occupant may not displace the additional chamber to the side when moving with high velocity in the direction of the additional chamber.

The occupant is catched in the cavity between the main chamber and the additional chamber, where he is protected in front direction and side direction as well from hitting onto the vehicle structure.

The extended section is designed preferably as a strap arranged at the side rim of the additional chamber. The advantage of the proposed embodiment is that the extended strap influences the inflation characteristic of the additional chamber in a very easy manner. As the extended section is arranged at the side rim without changing the protecting surface of the airbag there is no disadvantage regarding the restraint function and the occupant may not collide for example with crossing tether straps, which are usually used when the inflation geometry should be changed. Furthermore it is possible to control or influence the inflation characteristic by extending the extended section in the maximum case over its full length of the additional chamber.

DESCRIPTION OF THE DRAWINGS

In the following, the invention is described on the basis of preferred embodiments with reference to the accompanying figures. The figures show in detail.

DETAILED DESCRIPTION

Figure 1:
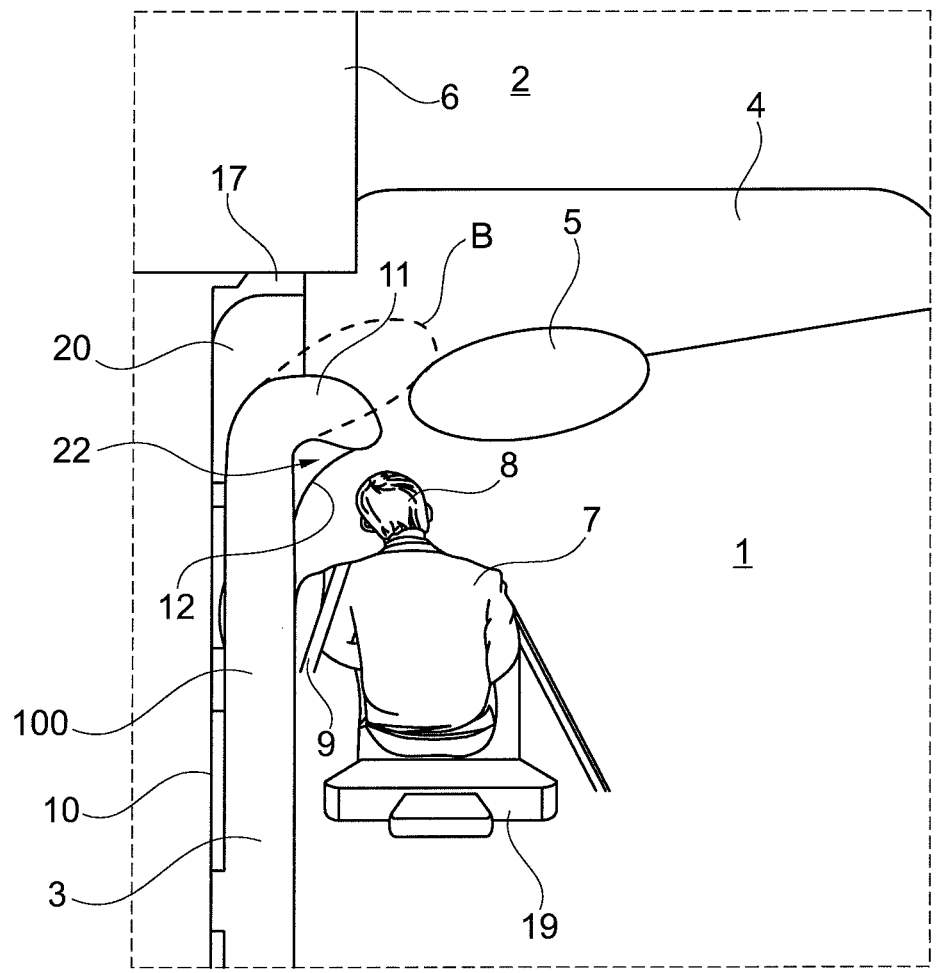
FIG. 1: Top view of vehicle interior with occupant and curtain airbag.

FIG. 1 shows a curtain airbag 100 in the inflated state in the interior 1 of the vehicle which is currently being decelerated by an object 6 intruding frontally with a small overlap. An A-pillar 17 is pushed into the interior 1 of the vehicle and a dashboard 4 is displaced from its edge in the direction of the center of the interior 1 by the intruding object 6. Due to the dashboard 4 being displaced obliquely inwards a gap 20 is generated between the edge of the dashboard 4 and the inner side structure 10 of the vehicle. Furthermore, an occupant 7 sitting in a vehicle seat 19 can be seen, which owing to the suddenly acting vehicle deceleration performs a forward movement in the direction of the gap 20 or the A-pillar 17, which is located beneath a steering wheel 5 and an airbag in the steering wheel 5. As the additional chamber 11 of the curtain airbag 100 according to the invention is located on the main chamber 3 in such a way that it deploys in the direction of the interior 1 of the vehicle, the curtain airbag 100 with the additional chamber 11 covers the gap 20 and/or the intruding A-pillar 17 and/or the upper edge of the door frame, so that the occupant 7 cannot hit one of these parts in a non-protected manner or intrude into the gap 20. In fact, a catching structure, which laterally as well as frontally protects the occupant 7 and in particular the head 8 of the occupant 7, is provided by the additional chamber 11 and the main chamber 3 in this area. Provided that the occupant 7 is wearing a safety belt 9, the obliquely directed forward movement already results from the safety belt 9 engaging asymmetrically over a shoulder of the occupant 7 and/or from the angled direction of the impact, which results in diagonal acceleration forces acting on the occupant 7. The additional chamber 11 is connected to the main chamber 3 via a triangular extended section 12, also called "sail", which limits the movement of the additional chamber 11 to the interior 1 of the vehicle. The movement without the sail is shown as a dashed line B. As the additional chamber 11 is hold by the sail in that position the driver airbag may not push the additional chamber 11 to the out- or front side when inflated. The additional chamber 11 and the driver airbag are inflated therefore face to face creating a stiff structure to restrain the occupant 7.

Figure 2:
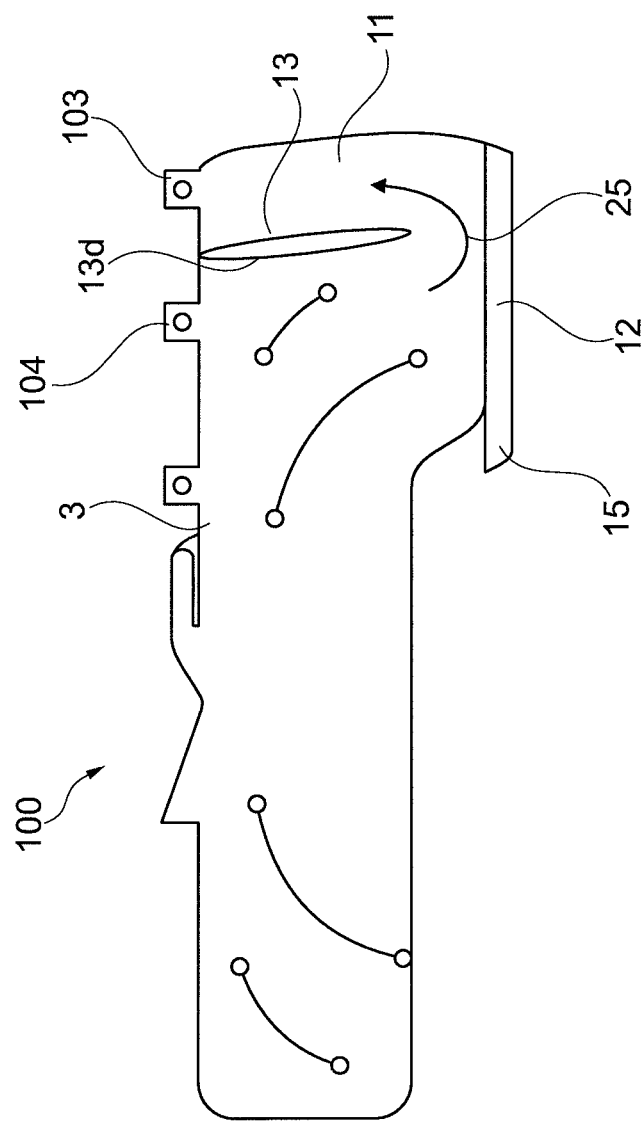
FIG. 2: Curtain airbag with an additional chamber separated by a vertical running separation line in an unfolded status.

FIG. 2 shows a curtain airbag 100 designed according to the invention comprising a main chamber 3 and an additional chamber 11 which, in the mounting position, is located on the in driving direction front portion of the main chamber 3. The additional chamber 11 is separated from the main chamber 3 by a separation line 13 and is flow-connected to the main chamber 3 via a flow channel 25, so that the additional chamber 11 is automatically inflated, when the main chamber 3 is inflated. The separation line 13 runs as a loop 13d with an enlarged extended section acting as a hinge during the inflation.

Furthermore, at the lower rim of the additional chamber 11, an extended section 12, also called dead fabric, is provided. The extended section 12 extends with a tongue 15 towards the main chamber 3. The extended section 12 is connected before folding the additional chamber 11 onto the main chamber 3 with the tongue at a lower preferably also extended section of the main chamber 3 to pull the additional chamber 11 towards the main chamber 3. The tongue 15 is dimensioned shorter than the distance to the extended section of the main chamber 3 to pull the additional chamber 11 towards the main chamber 3 when the tongue is connected.

The extended section 12 may be also designed as an extra strap which is sewn onto the rim sections of the additional chamber 11 and the main chamber 3. The sections where the strap is connected at the rim sections are arranged in a distance which is greater than the length of the strap.

The extended section 12 acts as a tightening strap which does not cross the main chamber 3 and the additional chamber 11 since the extended section 12 is arranged at the rim sections of the main chamber 3 and the additional chamber 11 at the same side.

Figure 3:
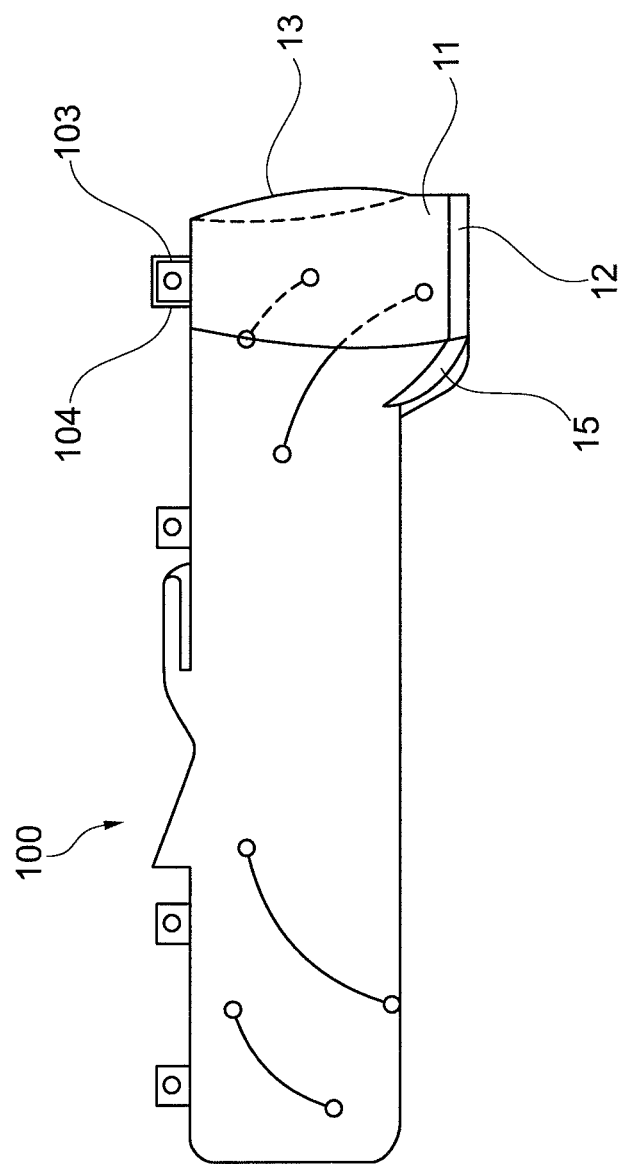
FIG. 3: Curtain airbag with an additional chamber separated by a vertical running separation line in a folded status.

The additional chamber 11 is provided with an attachment tab 103 which is folded backwards onto the main chamber 3 like shown in FIG. 3. The attachment tab 103 of the additional chamber 11 is arranged after the folding on an attachment tab 104 of the main chamber 3. The attachment tabs 103 and 104 are fixed together with a not shown fixation element, which can be also used for fixing the attachment tabs 103 and 104 at the inner side structure 10 of the vehicle. When the curtain airbag 100 is inflated in the folded status shown in FIG. 1 the additional chamber 11 will be inflated into the interior of the vehicle as the additional chamber 11 is fixed during the inflation with the attachment tab 103 at the attachment tab 104 at least at the upper rim of the curtain airbag 100. This effect supports the three dimensional shape of the main chamber 3 and the additional chamber 11.

Figure 5:
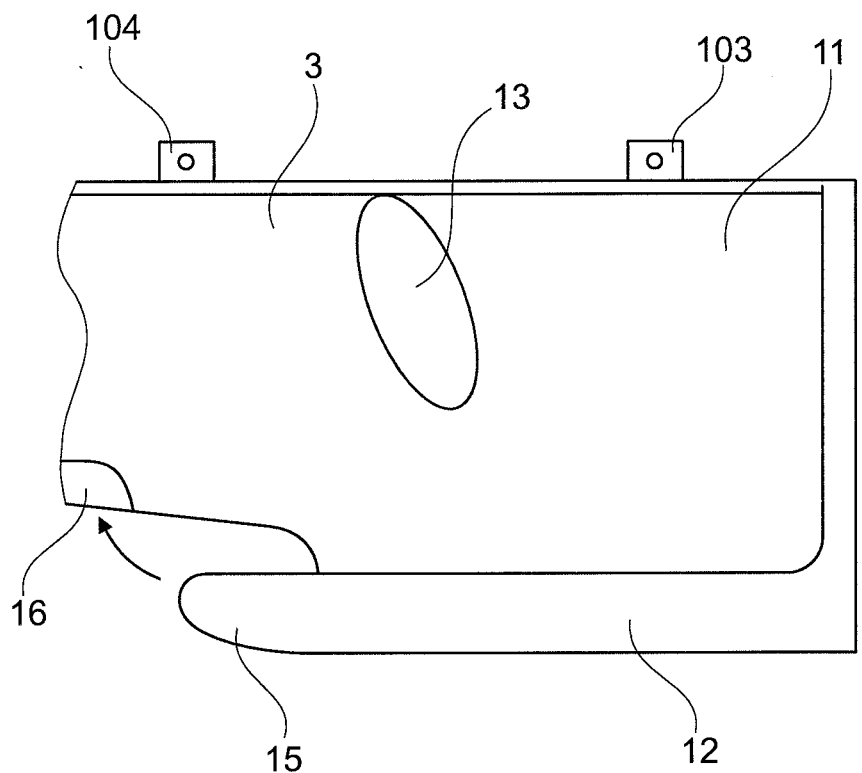
FIG. 5: Curtain airbag with an additional chamber and an extended section with a sidewise extending tongue in an unfolded status.
Figure 6:
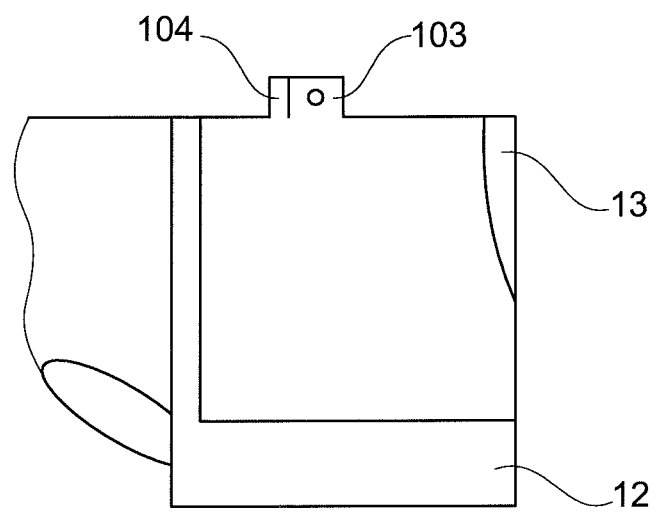
FIG. 6: Curtain airbag with an additional chamber and an extended section with a sidewise extending tongue in a folded status.

In the FIGS. 5 and 6 it is shown an enlarged section of the additional chamber 11 and the main chamber 3. The extended section 12 is provided with a tongue 15 directed towards the main chamber 3 as a prolongation of the non inflatable section 12 at the rim of the additional chamber 11. The tongue 15 is not connected sidewise to the additional chamber 11, so that it may be connected at a extended rim section 16 of the main chamber 3. The extended rim section 16 of the main chamber 3 where the tongue is attached is located with a greater distance in the unfolded status compared to the length of the tongue 15, so that the tongue 15 and the additional chamber 11 are pulled towards the main chamber 3. The additional chamber 11 and the front section of the main chamber 3 are shaped like a baseball glove when unfolded, to catch the occupant 7 when moving like shown in FIG. 1.

The advantage of this embodiment is that no extra part is needed and only one attachment step is needed to pull the additional chamber 11 towards the main chamber 3 by attaching the tongue 15 at the rim section 16 of the main chamber 3 in one step. The same advantage can be achieved when the tongue 15 is designed as a prolongation of a extended rim section of the main chamber 3 and connected at a section of the rim of the additional chamber 11.

Figure 4:
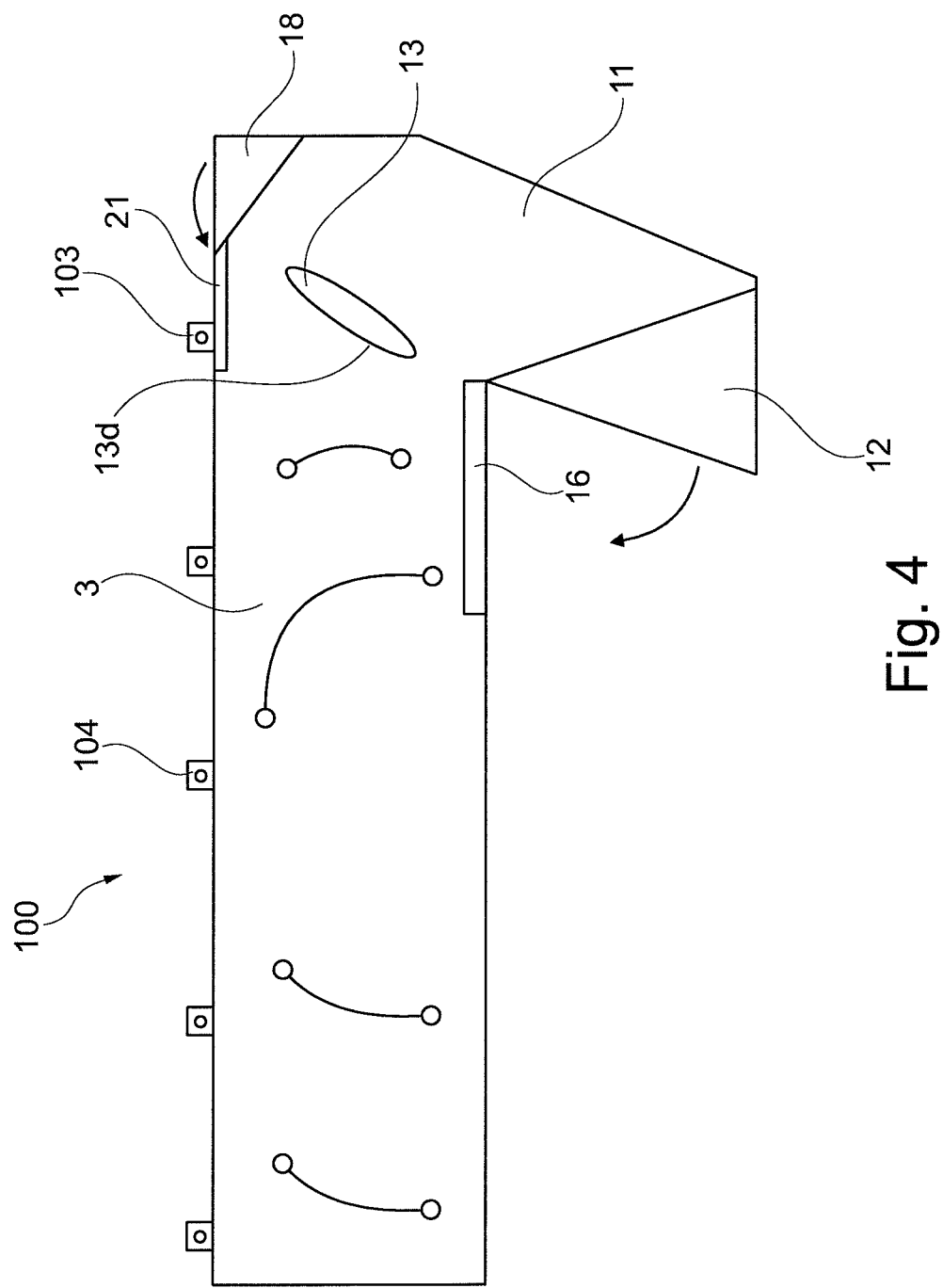
FIG. 4: Curtain airbag with an additional chamber and a triangular extended section in an unfolded status.

In the FIG. 4 it is shown the embodiment of the curtain airbag 100 from FIG. 1 where the extended section 12 is designed as a triangular prolongation like a sail, which is attached at the rim section 16 of the main chamber 3. The additional chamber 11 is furthermore provided with an extended section 18, by which the additional chamber 11 is attached at an upper rim section 21 of the main chamber 3. The extended section 18 acts additionally to guide the gasflow from the main chamber 3 downwards and sidewise into the additional chamber 11. One important feature is in this case that the extended section 12 and 18 are attached at rim sections 16 and 21 which are located at the same side of the main chamber 3. The upper extended section 18 is attached at an upper rim section 21 and the lower extended section 12 is attached at a lower rim section 16. The advantage of this design is that a clear cavity is created where the occupant 7 can dive in and the additional chamber 11 is attached with both rims at the main chamber 3.

The direction of deployment of the additional chamber 11 directed into the interior 1, is achieved by the extended section 12 limiting the movement of the additional chamber 11 relative to the main chamber 3 at one side. The extended section 12 does not cross the additional chamber 11 or the main chamber 3 as the connection is realized by a connection of the rim sections, so that an optimal restraint behavior can be realized without the risk an interference of the occupant with for example tethers.

The curtain airbag 100 can be manufactured by sewing up two fabric layers or by a fabric layer which is woven as one piece according to the "One Piece Woven (OPW)"-Technology, wherein the additional chamber 11 can be part of the fabric layer/s. In this case, the separation line 13 can be formed by a separation seam penetrating both fabric layers or, when the curtain airbag 100 is manufactured according to the OPW-Technology, can be manufactured simultaneously during the weaving process. The extended section 12 can be realized by an extension of one layer or as a sidewise extension of the extended rim of the airbag produced in the OPW technology.

Figure 7:
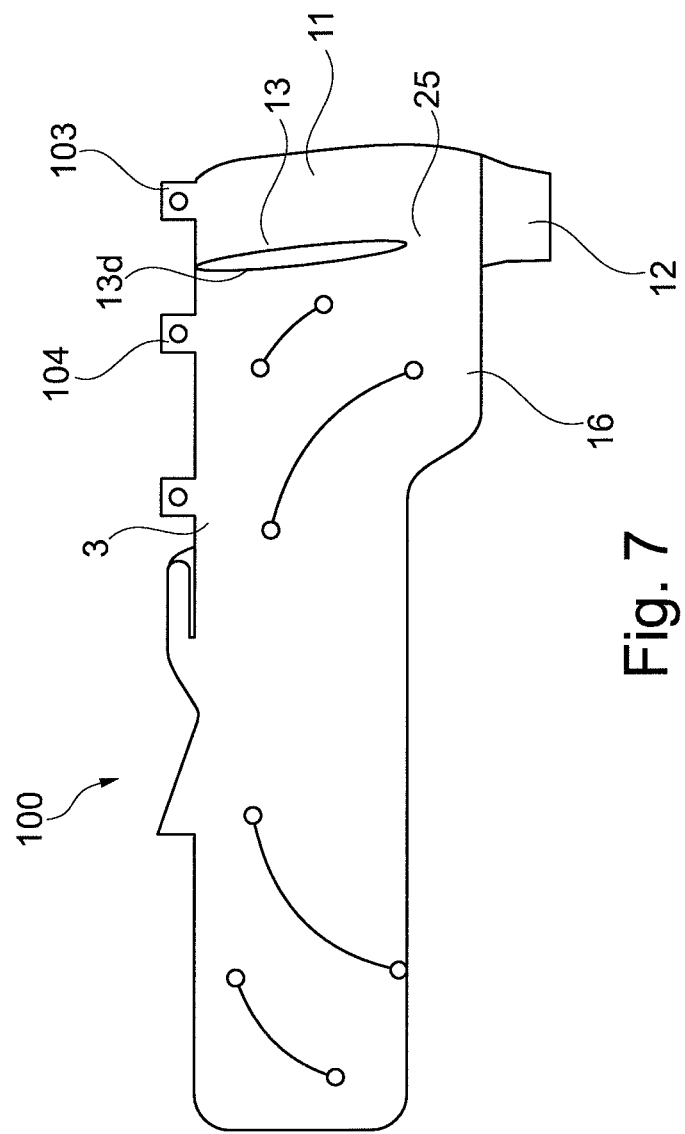
FIG. 7: Curtain airbag with an extended section arranged at the additional chamber before the folding process.
Figure 8:
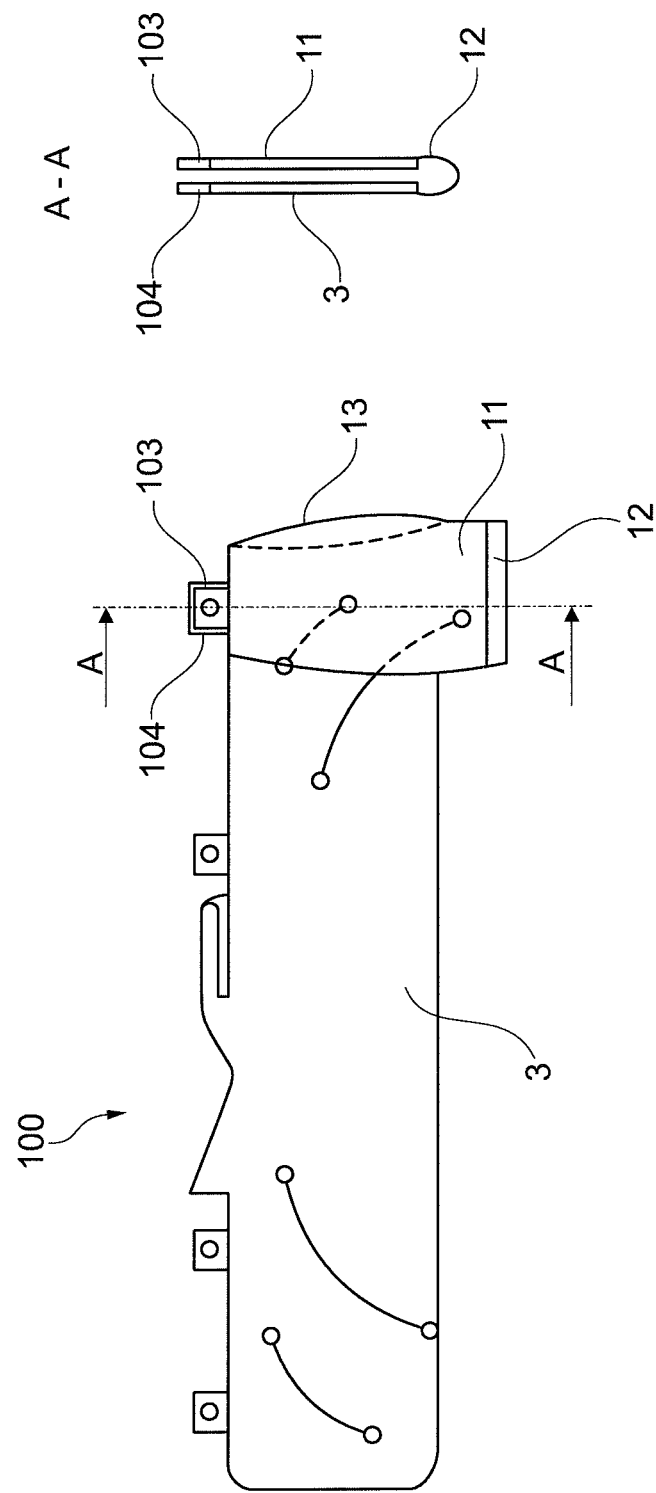
FIG. 8: Curtain airbag from FIG. 7 after folding the additional chamber onto the main chamber.

In the FIGS. 7 and 8 is shown another embodiment of the invention where the extended section 12 is designed as a flap, which is attached after folding the additional chamber 11 onto the main chamber 3 at an opposing side rim section 16 of the main chamber 3. The design after the folding with the attached flap is shown in the right cross section along the cutting line A-A. When the curtain airbag 100 is inflated in this status the main chamber 3 and the additional chamber as well will be inflated with a movement of the additional chamber 11 towards the interior 1 of the vehicle until the extended section 12 is tensioned and limits the further movement.

Figure 9:
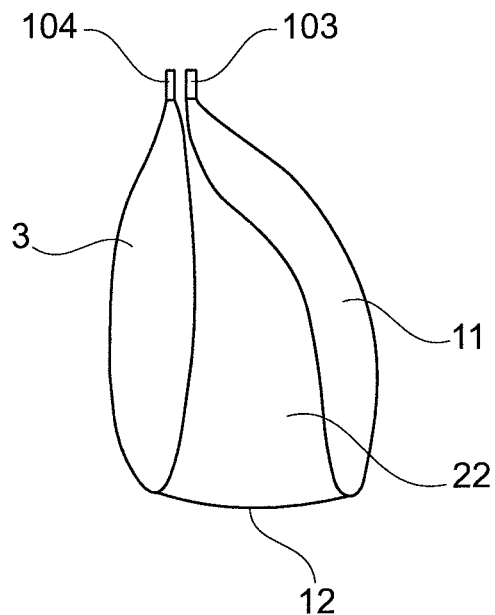
FIG. 9: Curtain airbag from FIG. 8 in view to cross section A-A in the inflated status.

In FIG. 9 it is shown the same cross section A-A when the curtain airbag 100 is inflated. The extended section 12 is tensioned, so that the additional chamber 11 and the main chamber 3 are distanced with enclosing a cavity 22 where the occupant 7 may dive in.

Figure 10:
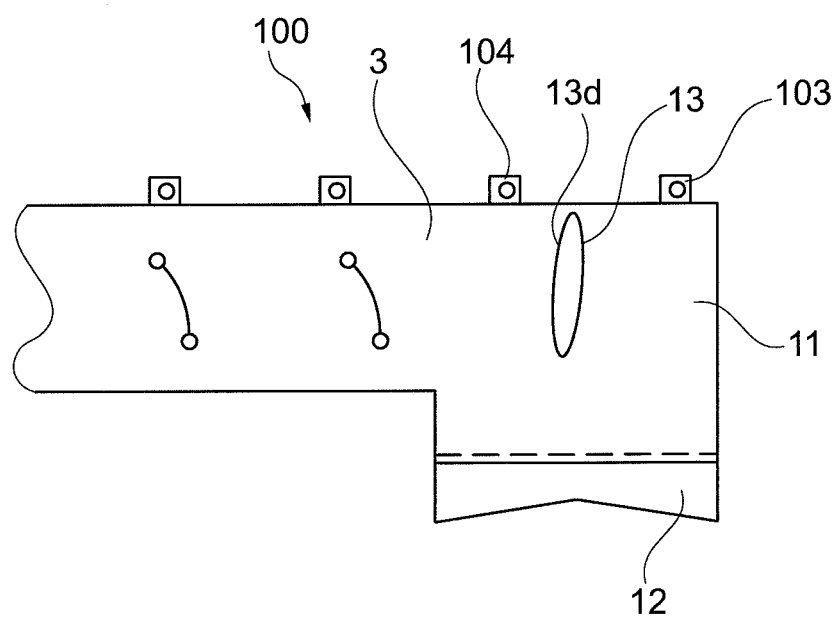
FIG. 10: Curtain airbag with a V-shaped extended section arranged along the rim sides of the main chamber and of the additional chamber.
Figure 11:
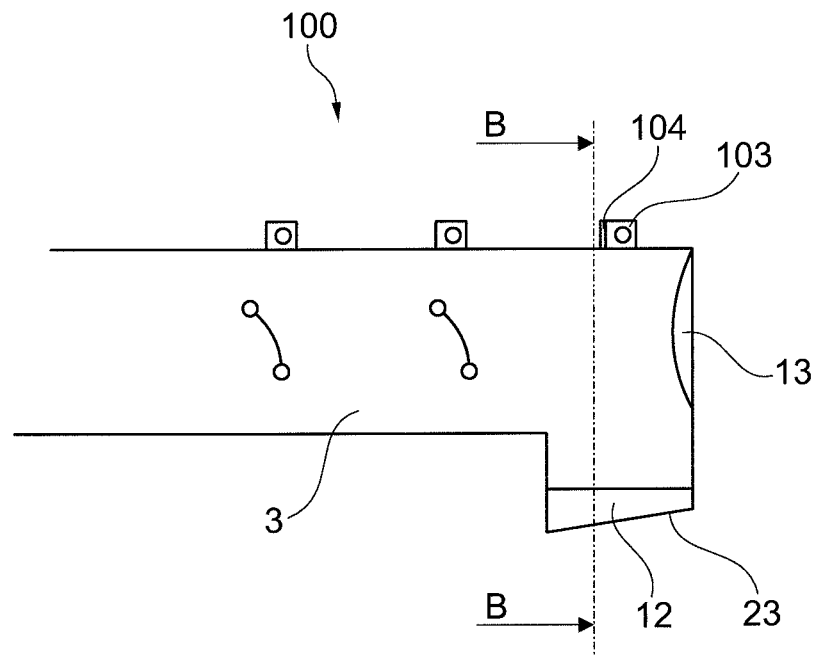
FIG. 11: Curtain airbag from FIG. 10 after folding the additional chamber onto the main chamber.
Figure 12:
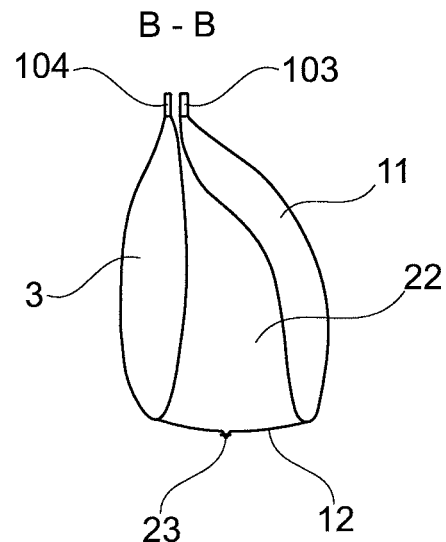
FIG. 12: Curtain airbag from FIG. 11 in view to cross section B-B in the inflated status.

In the FIGS. 10-12 it is shown another preferred embodiment where the extended section 12 is extending along the rim side of the additional chamber 11 and as well along the rim side of the main chamber 3 where the additional chamber 11 is folded onto. In FIG. 11 it is shown the same curtain airbag 100 after folding the additional chamber 11 onto the main chamber 3. As it can be seen the lower rim of the extended section 12 is running in an angle to the lower rim of the additional chamber 11 and of the main chamber 3 because the extended section 12 is shaped in the unfolded status shown in FIG. 10 like a V or an arrow with the peak directed to the top. The extended section 12 is sewn after the folding in a seam 23 at the rim sections. The advantage of this design can be seen therein that the distance of the additional chamber 11 to the main chamber 3 is continuously decreasing in forward direction of the curtain airbag 100 when inflated, which results in a centralizing effect for the occupant 7 when he dives with the head 8 into the cavity 22.

In general the extended sections 12 and 18 may be inflatable, but using non-inflatable sections 12 and 18 is here advantageous as the extended sections 12 and 18 can be manufactured and sewn in an easier manner. Furthermore the extended sections 12 and 18 got the only purpose to control the inflation characteristic of the additional chamber 11 with respect to the main chamber 3, so there is no disadvantage in the restraint behavior if the extended sections 12 and 18 are non-inflatable. One advantage with inflating also the extended section 12 and 18 can be seen therein, that the extended sections 12 and 18 can be tensioned additionally by the inflation with a shortening effect.

The invention claimed is:

1. A curtain airbag for a vehicle comprising:
   a main chamber having an upper perimeter for mounting to the vehicle, the main chamber shaped such that in a position mounted on the vehicle in an inflated state, the main chamber is for covering an inner side structure of the vehicle, the main chamber including upper and lower edges and having a length greater than a height;
   an additional chamber which in the position mounted on the vehicle is located on a vehicle front portion of the main chamber in a driving direction of the vehicle, and deploys in a direction of an interior of the vehicle when the curtain airbag is inflated, the additional chamber in fluid communication with the main chamber; and
   an extended section connecting the additional chamber and the main chamber at a rim section at a same side and which limits movement of the additional chamber during an inflation process, the extended section extending from the additional chamber and secured along the lower edge of the main chamber so as to orient the additional chamber generally perpendicular to the main chamber within a horizontal plane upon inflation of the airbag.

2. The curtain airbag according to claim 1, wherein the extended section is non-inflatable.

3. The curtain airbag according to claim 1, wherein the extended section is attached at the main chamber after folding the additional chamber onto the main chamber.

4. The curtain airbag according to claim 1, wherein the additional chamber is further provided with another extended section, the extended section and the another extended section are both connected after folding the additional chamber onto the main chamber.

5. The curtain airbag according to claim 4, wherein the extended section and the another extended section of the additional chamber are made in one piece with the additional chamber.

6. The curtain airbag according to claim 1, wherein the extended section is shaped triangular and attached with one side rim at the additional chamber and with another side rim at the main chamber enabling a predefined angular orientation of the additional chamber with respect to the main chamber in the inflated state.

7. The curtain airbag according to claim 1, wherein the extended section is located in a horizontal plane when the curtain airbag is inflated.

8. The curtain airbag according to claim 1, wherein the main chamber, the additional chamber and extended section cooperate to define a cavity having a closed bottom.

9. The curtain airbag according to claim 1, wherein:
the main chamber has a length and a height, the length being greater than the height, the main chamber further including upper and lower edges parallel to the length; and
the extended section extending from the additional chamber and is secured along the lower edge of the main chamber.

10. The curtain airbag according to claim 1, wherein the upper and lower edges are parallel to the length.

11. A curtain airbag for a vehicle comprising:
a main chamber having a length and a height, the length being greater than the height, the main chamber further including upper and lower edges parallel to the length;
an additional chamber in fluid communication with the main chamber; and
an extended section connecting the additional chamber and the main chamber, the extended section extending from the additional chamber and is secured along the lower edge of the main chamber so as to orient the additional chamber generally perpendicular to the main chamber within a horizontal plane upon inflation of the airbag.

12. A curtain airbag for a vehicle comprising:
a main chamber having a length and a height, the length being greater than the height, the main chamber further including upper and lower edges parallel to the length;
an additional chamber in fluid communication with the main chamber;
a first extended section connecting the additional chamber and the main chamber, the first extended section extending from the additional chamber and is secured along the lower edge of the main chamber so as to orient the additional chamber generally perpendicular to the main chamber within a horizontal plane upon inflation of the airbag; and
a second extended section connecting the additional chamber and the main chamber, the second extended section extending from the additional chamber and secured along the upper edge of the main chamber.

* * * * *